US010833716B2

(12) United States Patent
Beauregard et al.

(10) Patent No.: US 10,833,716 B2
(45) Date of Patent: Nov. 10, 2020

(54) TRIM ELEMENT COMPRISING A DOCKING STATION FOR A NOMAD ELECTRONIC DEVICE

(71) Applicant: Faurecia Interieur Industrie, Nanterre (FR)

(72) Inventors: Julien Beauregard, Mesnil en Thelle (FR); Sergio Da Costa Pito, Cergy (FR); Christophe Brunard, Bois Colombes (FR)

(73) Assignee: FAURECIA INTERIEUR INDUSTRIE, Nanterre (FR)

( * ) Notice: Subject to any disclaimer, the term of this patent is extended or adjusted under 35 U.S.C. 154(b) by 0 days.

(21) Appl. No.: 15/442,547

(22) Filed: Feb. 24, 2017

(65) Prior Publication Data
US 2017/0250717 A1  Aug. 31, 2017

(30) Foreign Application Priority Data

Feb. 25, 2016  (FR) ...................... 16 51560

(51) Int. Cl.
*H04B 1/3822* (2015.01)
*B60R 11/02* (2006.01)
*H04B 1/3877* (2015.01)
*B60R 11/00* (2006.01)

(52) U.S. Cl.
CPC ............ *H04B 1/3822* (2013.01); *B60R 11/02* (2013.01); *H04B 1/3877* (2013.01); *B60R 2011/0005* (2013.01); *B60R 2011/0008* (2013.01); *B60R 2011/0071* (2013.01); *B60R 2011/0075* (2013.01)

(58) Field of Classification Search
CPC ........................ H04B 1/3822; H04B 1/3877
See application file for complete search history.

(56) References Cited

U.S. PATENT DOCUMENTS

| 6,058,298 | A  | * | 5/2000  | Stamegna   | B60R 11/0241 |
|           |    |   |         |            | 455/345      |
| 9,332,207 | B2 | * | 5/2016  | Nakayama   | B60K 37/02   |
| 9,358,929 | B1 | * | 6/2016  | Huebner    | B60R 11/02   |
| 9,473,606 | B1 | * | 10/2016 | Sumida     | H04M 1/04    |
| 9,699,285 | B1 | * | 7/2017  | Lundsgaard | H04M 1/6075  |

(Continued)

FOREIGN PATENT DOCUMENTS

WO   WO2015063421 A1   5/2015

OTHER PUBLICATIONS

French Search Report in French for application No. FR1651560, dated Oct. 10, 2016, 2 pages.

(Continued)

*Primary Examiner* — Nguyen T Vo
(74) *Attorney, Agent, or Firm* — Reising Ethington P.C.

(57) ABSTRACT

A docking station having a base, a first maintaining element and a second maintaining element arranged to bear on two opposite edges of a contour of a nomad electronic device received between the first maintaining element and the second maintaining element. The first maintaining element is movable relative to the base to adjust the separation between the first maintaining element and the second maintaining element based on the distance separating the two opposite edges of the nomad electronic device. A visible outer surface of the first maintaining element includes at least one control element and/or at least one device displaying a function of the vehicle.

13 Claims, 2 Drawing Sheets

(56) References Cited

U.S. PATENT DOCUMENTS

| | | | | |
|---|---|---|---|---|
| 2001/0045774 A1* | 11/2001 | Rode | ............... | B60N 2/0248 307/9.1 |
| 2002/0190176 A1* | 12/2002 | Louh | ............... | B60R 11/0241 248/316.4 |
| 2008/0174136 A1* | 7/2008 | Welschholz | ............... | B60R 7/06 296/37.12 |
| 2010/0232117 A1 | 9/2010 | Yoon | | |
| 2012/0018473 A1* | 1/2012 | Da Costa Pito | ............... | B60R 11/02 224/282 |
| 2013/0157607 A1* | 6/2013 | Paek | ............... | G06F 1/1632 455/404.1 |
| 2013/0233986 A1* | 9/2013 | Rasheta | ............... | G03B 17/561 248/205.1 |
| 2014/0138419 A1* | 5/2014 | Minn | ............... | B60R 11/0241 224/567 |
| 2014/0339847 A1* | 11/2014 | Brunard | ............... | B60R 11/02 296/37.12 |
| 2014/0354002 A1 | 12/2014 | Bisceglia et al. | | |
| 2014/0361569 A1 | 12/2014 | Crepaldi et al. | | |
| 2015/0343957 A1* | 12/2015 | Narayanan | ............... | B60R 11/02 224/275 |
| 2016/0088134 A1* | 3/2016 | Mathew | ............... | H04M 1/0279 455/575.1 |
| 2016/0238707 A1* | 8/2016 | Thomas | ............... | G01S 17/026 |
| 2016/0257260 A1 | 9/2016 | Barre et al. | | |
| 2016/0288730 A1* | 10/2016 | Lee | ............... | B60R 11/02 |

OTHER PUBLICATIONS

Written Opinion in French for application No. FR1651560, dated Oct. 10, 2016, 4 pages.

* cited by examiner

TRIM ELEMENT COMPRISING A DOCKING STATION FOR A NOMAD ELECTRONIC DEVICE

TECHNICAL FIELD

The present invention relates to a vehicle trim element, of the type comprising a docking station for a nomad electronic device, wherein said docking station comprises a base, a first maintaining element and a second maintaining element arranged to bear on two opposite edges of a contour of a nomad electronic device received between the first maintaining element and the second maintaining element, the first maintaining element being movable relative to the base to adjust the separation between the first maintaining element and the second maintaining element based on the distance separating the two opposite edges of the nomad electronic device.

BACKGROUND

It is known to provide a trim element comprising a docking station able to receive a nomad, or mobile, electronic device, such as a mobile user terminal, a mobile telephone, a smartphone, a digital tablet or the like.

Such a docking station is advantageously arranged to leave the screen of the nomad electronic device visible so that the display remains visible for the occupants of the vehicle. To that end, the docking station makes it possible to maintain the electronic device by two of its opposite edges using two maintaining elements, while the body of the electronic device extends on a base extending between the two maintaining elements.

In order for the device to remain visible, the base and the maintaining elements must also be arranged in a visible zone of the passenger compartment of the vehicle, for example on the dashboard when the trim element forms all or part of this dashboard.

Consequently, the base and the maintaining elements remain visible even when no electronic device is received by the station, which may be detrimental to the general appearance of the trim elements.

Furthermore, the docking station occupies a space that may be useful to perform other functions of the vehicle, which are then integrated into another space of the trim element, which may make them less accessible and/or be detrimental to the general appearance of the trim element by "overloading" it.

SUMMARY

One of the aims of the invention is to overcome these drawbacks by proposing a trim element comprising a docking station aesthetically and functionally integrated into the trim element.

To that end, the invention relates to a trim element of the aforementioned type, in which a visible outer surface of the first maintaining element comprises at least one control element and/or at least one display device displaying a function of the vehicle.

By integrating a control element and/or a display device for a function of the vehicle into the first maintaining element of the docking station, this maintaining element remains functional and has a more satisfactory appearance irrespective of whether the docking station receives a nomad electronic device. Furthermore, the control element and/or the display device extend on the docking station and therefore do not need to be integrated in a different location of the trim element. Thus, the functionality and appearance of the trim element according to the invention are improved. Furthermore, the control element and/or the display device are always accessible for a user, irrespective of the position and size of the nomad electronic device. Indeed, the control element and/or the display device move with the first maintaining element when the latter is moved relative to the base to adjust the separation between the first maintaining element and the second maintaining element.

The trim element optionally comprises one or more of the following features, considered alone or according to any technically possible combination(s):

- the second maintaining element is stationary relative to the base;
- the second maintaining element is formed by the edge of a functional or decorative member of the trim element of the vehicle;
- said functional or decorative member is an air outlet device emerging in the trim element or a wheel cover extending around an air outlet device emerging in the trim element;
- the base is formed by an outer surface of the trim element, said outer surface extending between the first maintaining element and the second maintaining element;
- at least one display device extends on said outer surface of the base between the first maintaining element and the second maintaining element, said display device being visible when the docking station does not receive a nomad electronic device;
- the docking station comprises means for communicating with the nomad electronic device, said communication means being arranged to send to the nomad electronic device at least the information displayed by the display device such that this information can be displayed on the electronic device when the docking station receives said nomad electronic device;
- the control element and/or the display device of the first maintaining element are a control button and/or a display screen of a sound system and/or a ventilation system of the vehicle;
- the first maintaining element is mounted sliding in at least one groove extending along an edge of the base in a direction substantially perpendicular to the direction in which the first maintaining element and the second maintaining element extend; and
- the trim element forms at least part of a dashboard of the vehicle.

BRIEF DESCRIPTION OF THE DRAWINGS

Other aspects and advantages of the invention will appear upon reading the following description, provided as an example and done in reference to the appended drawings, in which.

DETAILED DESCRIPTION

Figure 1:
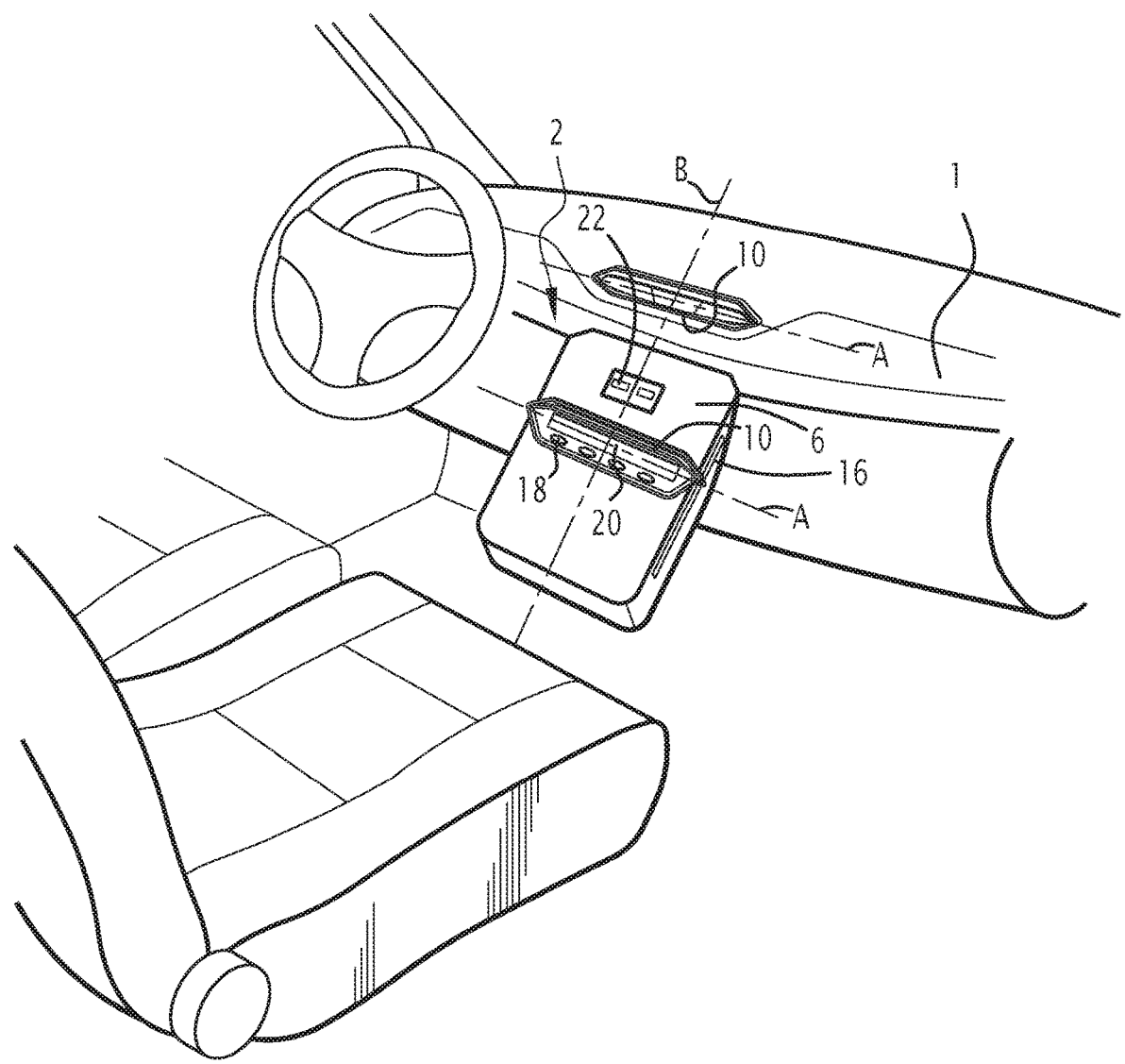
FIG. 1 is a diagrammatic perspective illustration of a vehicle trim element according to the invention, the docking station not receiving a nomad electronic device.

In reference to FIG. 1, a trim element 1 is described forming, in the embodiment shown in this figure, a vehicle dashboard. It is, however, understood that the invention is not limited to a dashboard and may be applied to other vehicle trim elements, for example a door panel, the trim of a center console, a seat or the like.

The trim element 1 comprises a docking station 2 for a nomad electronic device 4, for example a mobile user terminal, a mobile telephone, a smartphone, a digital tablet or the like. In the case of a dashboard, the docking station is for example arranged between the two front seats of the vehicle, in a space that is accessible and visible for both front passengers of the vehicle, as shown in FIG. 1.

The docking station 2 comprises a base 6 extending between a first maintaining element 8 and a second maintaining element 10.

The base 6, on which the nomad electronic device 4 is intended to extend when it is received by the docking station 2, is for example formed by an outer surface of the trim element, i.e., by a surface turned toward the passenger compartment of the motor vehicle and visible from this motor vehicle compartment when no nomad electronic device 4 is received by the docking station 4, as shown in FIG. 1. Alternatively, the base 6 is formed by an element, such as a plate, attached on the outer surface of the trim element and fastened thereto.

Figure 2:
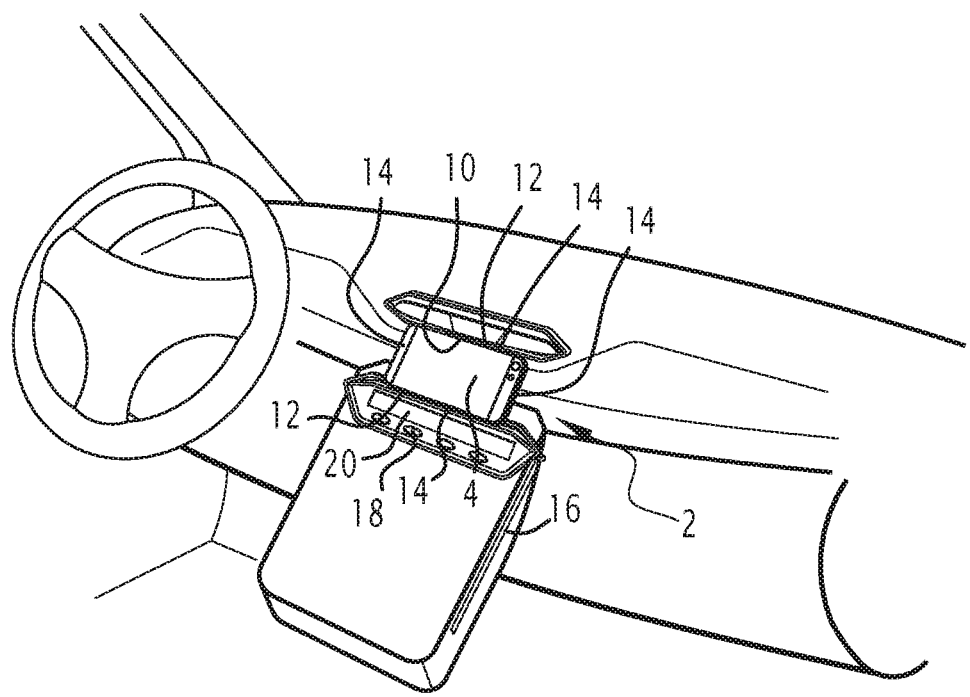
FIG. 2 is a diagrammatic illustration of part of the trim element of FIG. 1, the docking station receiving a nomad electronic device in a first orientation.
Figure 3:
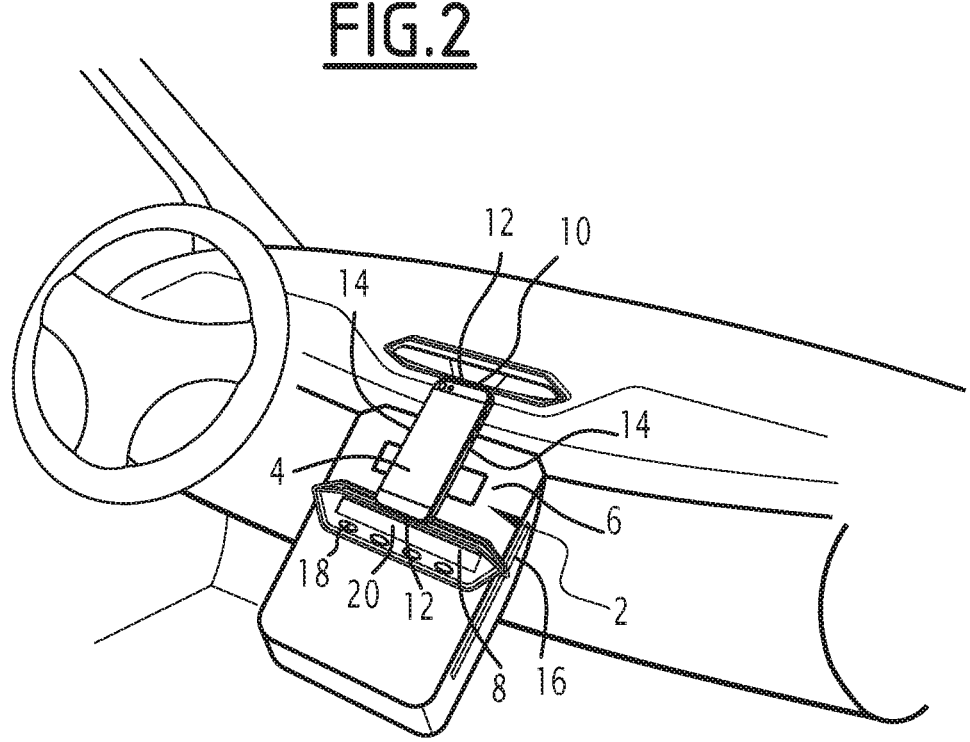
FIG. 3 is a diagrammatic illustration of part of the trim element of FIG. 1, the docking station receiving a nomad electronic device in a second orientation.

The first maintaining element 8 and the second maintaining element 10 extend protruding from the outer surface of the trim element so as to form jaws able to retain the nomad electronic device 4 between them when it is received on the base 6, as shown in FIGS. 2 and 3 and as will be described later.

The first and second maintaining elements 8 and 10 extend substantially parallel on either side of the base 6 primarily along a direction A substantially perpendicular to the direction B along which the first and second maintaining elements 8 and 10 are separated from one another, as shown in FIG. 1.

Each maintaining element 8 and 10 comprises an edge 12, extending opposite the edge 12 of the other maintaining element, suitable for being made to bear against an edge 14 of the contour of the nomad electronic device 4 such that when a nomad electronic device 4 is received on the base 6, the edges 12 of the first maintaining element 8 and the second maintaining element 10 bear on two opposite edges 14 of the contour of the nomad electronic device 4, as shown in FIGS. 2 and 3.

The first maintaining element 8 is movable relative to the base 6 and relative to the second maintaining element 10 so as to allow an adjustment of the separation along the direction B between the first and second maintaining elements 8 and 10. Thus, by moving the first maintaining element 8, the size of the base 6 along the direction B can be adjusted to the distance separating the two opposite edges 14 of the contour of the nomad electronic device 4. The docking station 2 is therefore adaptable to different types of nomad electronic devices 4 having different dimensions or makes it possible to receive a same electronic device with different orientations. As an example, the docking station 2 showing FIG. 2 receives the electronic device 4 in a "landscape" orientation, i.e., it holds the electronic device 4 by its two lateral edges 14, and the docking station shown in FIG. 3 receives the electronic device 4 in a "portrait" orientation, i.e., it holds the electronic device 4 by its lower and upper edges 14. The dimension of the edges 12 of the first and second maintaining elements 8 and 10 along the direction A in which they extend is also suitable for allowing the electronic devices to be held in different orientations or different sizes, in particular to allow the holding of both mobile telephone and a tablet, for example.

According to the embodiment shown in figures, the first maintaining element 8 is translatable along the direction B to allow it to be moved away from or closer to the second maintaining element 10. As an example, the docking station 2 comprises two grooves 16 extending, along the movement direction of the first maintaining element 8, i.e., along the direction B, along the edges of the base 6 separated from one another along the direction A. The first maintaining element 8 comprises, near its ends, two guide elements (not shown) each slidingly engaged in one of the grooves 16 so as to guide the movement of the first maintaining element 8 along the direction B.

According to another embodiment, the first maintaining element 8 could be rotatable relative to the base.

According to one embodiment, the docking station 2 comprises at least one return element (not shown) arranged to stress the first maintaining element 8 toward an idle position, in which the first maintaining element 8 is found when the docking station 2 does not receive an electronic device 4. Such a return element further allows automatic positioning of the first maintaining element 8 bearing against an electronic device 4 when the first maintaining element 8 has been moved away to place the electronic device against the base 6.

The second maintaining element 10 is stationary relative to the base 6 and relative to the rest of the trim element 1.

According to the embodiment shown in the figures, the first maintaining element 8 forms the lower edge of the base 6 and the second maintaining element forms the upper edge of the base 6. It is, however, understood that the first maintaining element could form the upper edge or a lateral edge of the base and that the second maintaining element could form the lower edge or another lateral edge of the base.

In order to improve the appearance and functionality of the docking station 2, the outer surface of the first maintaining element 8, i.e., its surface turned toward the passenger compartment of the vehicle extending from the edge 12 of the first maintaining element 8, bears at least one control element 18 and/or display device 20 for at least one function of the vehicle in which the trim element 1 is mounted. A function of the vehicle refers to any function making it possible to control or give information to a system incorporated into the vehicle other than a function related to the nomad electronic device 4 received by the docking station 2. This means that the control element 18 and/or the display device 20 are not related to the operation of the nomad electronic device 4, but to the operation of another system incorporated into the vehicle.

As an example, the control element 18 is for example a control button making it possible to control the sound system, or car radio, of the vehicle, or its ventilation, air conditioning or other system. The display device 20 is for example a screen making it possible to display information on what the audio system is broadcasting or on the temperature in the passenger compartment of the vehicle or the like.

According to the embodiment shown in the figures, the first maintaining element 8 comprises several control elements 18 and a display device 20 connected to one or several functions of the vehicle. The display device 20 is for example able to switch between displaying information related to one function and information related to another function of the vehicle. Alternatively or moreover, several display devices 20 can be provided.

Thus, the first maintaining element 8 has a functional aspect related to a function other than that of holding a nomad electronic device 4, which makes this element useful even when no electronic device is received on the docking station 2. In this way, when the docking station 2 is not in use, it is not an "empty" space lacking interest for the passengers of the vehicle. The general appearance of the trim element 1 is thus improved, more particularly when no electronic device is received by the docking station 2.

The control element(s) 18 and the display device 20 are connected to the electronics of the vehicle so as to allow them to be connected to the other elements making it possible to perform the function(s) controlled by this or these elements 18 and/or the information of which is displayed by the display device 20.

Alternatively or furthermore, and as more particularly shown in FIG. 1, a display device 22 is provided on the base 6 between the first maintaining element 8 and the second maintaining element 10 such that this display device 22 is only visible when no electronic device 4 is received by the docking station 2. This display device is for example a clock, a temperature indicator or the like. Thus, the outer surface of the base 6, which is usually a space left empty when the station is not in use, remains useful when no device is received by the docking station 2.

According to one embodiment, the information displayed by the display device 22 is sent to the electronic device 4 when it is received by the docking station 2. This information is then displayed on the screen of the electronic device 4 such that the information remains visible for the passengers of the vehicle even when the display device 22 is hidden by the electronic device 4. This information is for example displayed in a strip occupying part of the screen of the electronic device 4 or on the entire screen thereof. To that end, the docking station 2 may comprise means for communicating with the electronic device 4 making it possible to send at least the information displayed by the display device 22 to the electronic device 4. The communication means allow a data transfer between the docking station 2 and the electronic device 4 using any appropriate electronic communication protocol, such as "Bluetooth®", NFC (Near Field Communication) or the like. Thus, the information displayed by the display device 22 (and optionally other information related to the operation of the vehicle) can be sent to the electronic device 4 when it is positioned on the docking station 2.

Alternatively or furthermore, the second maintaining element 10 can be combined with a functional or decorative member also provided on the trim element. In other words, the edge 12 of the second maintaining element 10 is formed by the edge of a functional or decorative member provided on the trim element to perform a function other than that of holding a nomad electronic device 4. Thus, the second maintaining element 10 is "hidden" and is not identifiable as such by the passengers of the vehicle, which improves the appearance of the trim element.

As an example, the functional or decorative member is formed by the mouth of an air outlet device, or air vent, emerging in the outer surface of the trim element near the base 6, or by a wheel cover for such a mouth. It is understood that another member or cover could be used to produce the second, stationary maintaining element 10 of the docking station 2.

The trim element 1 comprising a docking station 2 described above thus has a particularly satisfactory appearance even when the docking station 2 does not receive a nomad electronic device 4, in particular because the visible surfaces of the docking station are used to perform other functions or are hidden by being integrated into other surfaces of the trim element 1.

The invention claimed is:

1. A vehicle trim element comprising a docking station for a nomad electronic device, said docking station comprising a base, a first maintaining element and a second maintaining element arranged to bear on two opposite edges of a contour of a nomad electronic device received between the first maintaining element and the second maintaining element, the first maintaining element being movable relative to the base to adjust the separation between the first maintaining element and the second maintaining element based on the distance separating the two opposite edges of the nomad electronic device, wherein a visible outer surface of the movable first maintaining element comprises at least one control element for controlling a function of the vehicle and/or at least one display device displaying a function of the vehicle.

2. The trim element according to claim 1, wherein the second maintaining element is stationary relative to the base.

3. The trim element according to claim 2, wherein the second maintaining element is formed by the edge of a functional or decorative member of the trim element of the vehicle.

4. The trim element according to claim 3, wherein said functional or decorative member is an air outlet device emerging in the trim element or a cover extending around an air outlet device emerging in the trim element.

5. The trim element according to claim 1, wherein the base is formed by an outer surface of the trim element, said outer surface extending between the first maintaining element and the second maintaining element.

6. The trim element according to claim 5, wherein at least one display device extends on said outer surface of the base between the first maintaining element and the second maintaining element, said display device being visible when the docking station does not receive a nomad electronic device.

7. The trim element according to claim 6, wherein the docking station is configured to send to the nomad electronic device at least the information displayed by the display device such that this information can be displayed on the nomad electronic device when the docking station receives said nomad electronic device.

8. The trim element according to claim 1, wherein the control element of the first maintaining element is a control button of a sound system and/or a ventilation system of the vehicle and/or the display device of the first maintaining element is a display screen of a sound system and/or of a ventilation system of the vehicle.

9. The trim element according to claim 1, wherein the first maintaining element is mounted sliding in at least one groove extending along an edge of the base in the direction in which the first maintaining element is movable.

10. The trim element according to claim 1, forming at least part of a dashboard of the vehicle.

11. The trim element according to claim 1, whereby the first maintaining element has a functional aspect related to a function other than that of holding the nomad electronic device so that the first maintaining element provides said functional aspect even when the nomad electronic device is not received on the docking station.

12. A vehicle trim element comprising a docking station for a nomad electronic device, said docking station comprising a base, a first maintaining element and a second maintaining element arranged to bear on two opposite edges of a contour of a nomad electronic device received between the first maintaining element and the second maintaining element, the first maintaining element being movable relative to the base to adjust the separation between the first maintaining element and the second maintaining element based on the distance separating the two opposite edges of the nomad electronic device, wherein a visible outer surface of the movable first maintaining element comprises at least one control element for controlling a function of the vehicle and/or at least one display device displaying a function of the vehicle, and wherein the second maintaining element is formed by the edge of a functional or decorative member of the trim element of the vehicle.

13. A vehicle trim element comprising a docking station for a nomad electronic device, said docking station comprising a base, a first maintaining element and a second maintaining element arranged to bear on two opposite edges of a contour of a nomad electronic device received between the first maintaining element and the second maintaining element, the first maintaining element being movable relative to the base to adjust the separation between the first maintaining element and the second maintaining element based on the distance separating the two opposite edges of the nomad electronic device, wherein a visible outer surface of the movable first maintaining element comprises at least one control element for controlling a function of the vehicle and/or at least one display device displaying a function of the vehicle, wherein the second maintaining element is formed by the edge of a functional or decorative member of the trim element of the vehicle, and wherein said functional or decorative member is an air outlet device emerging in the trim element or a cover extending around an air outlet device emerging in the trim element.

\* \* \* \* \*